United States Patent
McCarthy et al.

[11] Patent Number: 6,056,659
[45] Date of Patent: May 2, 2000

[54] MULTIPLE-RATIO AUTOMATIC TRANSMISSION WITH MULTIPLE-FUNCTION ROLLER CLUTCHES AND BRAKES

[75] Inventors: James Paul McCarthy, Milford; Laurence Andrew Deutsch, Farmington Hills; Norman Szalony, Brighton, all of Mich.

[73] Assignee: Ford Global Technologies, Inc., Dearborn, Mich.

[21] Appl. No.: 09/228,128

[22] Filed: Jan. 11, 1999

[51] Int. Cl.[7] ............................. F16D 13/06; F16D 43/28; F16H 3/62

[52] U.S. Cl. .................. 475/116; 475/145; 475/147; 475/325; 192/35; 192/85 AT

[58] Field of Search ................. 192/35, 36, 38, 192/54.52, 85 AT; 475/116, 125, 145, 147, 325

[56] References Cited

U.S. PATENT DOCUMENTS

| | | | |
|---|---|---|---|
| 2,074,510 | 3/1937 | Junkers | 192/35 |
| 2,497,603 | 2/1950 | Helstrom | 192/85 AT |
| 2,682,177 | 6/1954 | Kelbel | 475/325 X |
| 3,084,774 | 4/1963 | Liang . | |
| 3,134,417 | 5/1964 | Croswhite . | |
| 3,149,705 | 9/1964 | Shoquist | 192/35 |
| 3,895,700 | 7/1975 | Kerr | 192/41 R |
| 3,919,895 | 11/1975 | Kerr . | |
| 4,055,091 | 10/1977 | Kerr . | |
| 4,341,294 | 7/1982 | Kerr | 192/45 |
| 5,305,663 | 4/1994 | Leonard et al. . | |
| 5,638,931 | 6/1997 | Kerr | 192/45 |

*Primary Examiner*—Sherry L. Estremsky
*Attorney, Agent, or Firm*—Frank G. McKenzie; Roger L. May

[57] ABSTRACT

A multiple-ratio automatic transmission having plural torque delivery paths that are established and disestablished by a roller clutch and brake system. The clutch and brake system establishes and disestablishes torque flow paths while preventing simultaneous clutch or brake engagement. The clutch and brake system is capable of accommodating instantaneous torque reversals during ratio changes. Simplified clutch and brake system actuators trigger the application and release of the clutches and brakes during ratio changes.

8 Claims, 7 Drawing Sheets

| GEAR | | B1 | B2 | C1 | C2 | C3 | C4 | C5 | C6 | RATIO |
|---|---|---|---|---|---|---|---|---|---|---|
| 1 | M |  | X | X |  |  | X |  |  | 2.400 |
|  | D |  |  | X |  |  | X |  |  |  |
| 2 | M | X |  | X |  |  | OR | X | X | 1.467 |
|  | D |  |  | X |  |  |  | X | X |  |
| 3 |  |  |  | X |  | X |  | X | OR | 1.000 |
| 4 |  | X |  |  |  | X |  | X | OR | .667 |
| R |  |  | X |  | X |  |  |  |  | -2.000 |
| N |  |  |  |  |  |  |  |  |  |  |
| P |  |  |  |  |  |  |  |  |  |  |

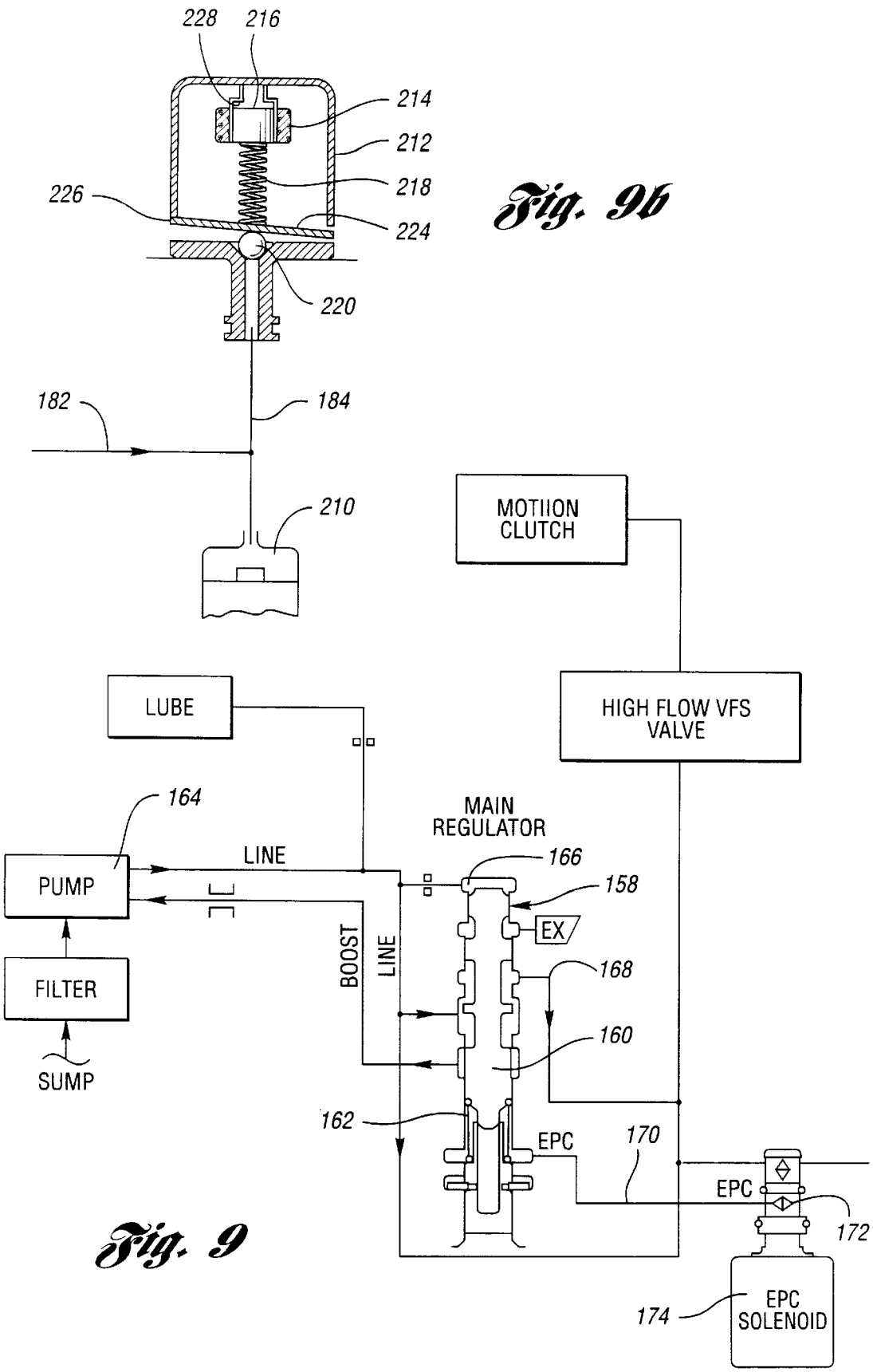

6,056,659

MULTIPLE-RATIO AUTOMATIC TRANSMISSION WITH MULTIPLE-FUNCTION ROLLER CLUTCHES AND BRAKES

TECHNICAL FIELD

An automatic transmission for use in a vehicle driveline in which relative motion of the gear elements of the transmission are controlled by mechanical roller clutches and brakes.

BACKGROUND OF THE INVENTION

U.S. Pat. Nos. 4,341,294 and 5,638,931 disclose overrunning couplings that include inner and outer races, the inner race being split to provide a variable internal diameter, and multiple rollers situated between the inner and outer races. The rollers register with internal spiral surfaces formed in the outer race and external spiral surfaces formed in the inner race. The spiral surfaces are engaged by the rollers to effect a locking action of the clutch. This develops a radial force on the inner race, causing the inner race to engage a torque transfer shaft that is surrounded by the inner race.

Copending patent application, Ser. No. 09/228,129, filed Jan. 11, 1999, entitled "MULTIPLE FUNCTION CONTROLLABLE OVERRUNNING COUPLING", discloses a hydrostatic pressure actuator for triggering the engagement and release of the rollers. That copending patent application is assigned to the assignee of the present invention.

U.S. Pat. No. 5,305,663, issued to Allan S. Leonard et al, discloses a compound planetary gear transmission for use in an automotive vehicle and driveline wherein friction clutches and brakes are used to control the motion of the elements of the gearing to effect ratio changes. Engagement and release of the friction clutches and brakes of the transmission require precise control of the timing of the engagement and release in order to effect a smooth transition from one ratio to the other.

The control system disclosed in the '663 patent responds to driveline variables so that the shift event occurs rapidly with a smooth transition. The control system accommodates varying torque levels and changes in direction of the torque delivery through the gearing. The friction elements are controlled by fluid pressure-operated servos and clutch actuators, the actuating pressure being modulated to minimize the effects of inertia torque as the elements of the gearing change speed during a shift event.

BRIEF DESCRIPTION OF THE INVENTION

The invention includes multiple ratio gearing that defines plural torque delivery paths. A motion clutch, which is engaged during both forward and reverse drive, delivers engine torque to the torque delivery elements of the gearing through first roller couplings. Second roller couplings anchor reaction elements of the gearing to the transmission housing. Each coupling has inner and outer races that have ramp recesses between them. Rollers are located in the recesses, the inner race being split to provide a gap. A fluid pressure chamber communicates with actuators to establish and disestablish frictional engagement of the inner race with a torque delivery element within the inner race as the rollers engage ramps in the recesses.

The invention includes a bidirectional clutch and brake system that performs the function of pressure-operated friction clutches and brakes of conventional transmissions such as the transmission of the '663 patent, but it is characterized further by instantaneous engagement and release of the clutches and brakes during shift events. The bidirectional clutches and brakes, which are called couplings in this disclosure, include simplified mechanical hydraulic actuators and a simplified control system for distributing and exhausting pressure from the actuators. The actuators and the associated couplings are strategically positioned in the transmission so that the mechanical components of the gear system with the greatest duty cycle are subjected only to engine torque rather than a multiple of engine torque. The actuators and the associated couplings for the higher gear ratios of the transmission are located near the torque output end of the gearing. Furthermore, this permits a reduced overall space requirement.

A conventional transmission of the kind disclosed in the '663 patent uses a torque converter between the input element of the gearing and the vehicle engine. The present transmission, in contrast, makes it possible to replace the torque converter and to achieve the torque multiplication normally associated with the torque converter by adding a final drive gear assembly that provides additional gear ratio combinations.

The inner and outer races are separately connected to torque transfer elements of the gearing. The rollers are positioned between the races, each roller being received in a recess formed in the inner surface of the outer race and the outer surface of the inner race. The rollers are wedged between the races when the gap between the split ends of the inner race is changed in size. The fluid pressure actuators for changing the size of the gap has been disclosed in the copending application identified above.

BRIEF DESCRIPTION OF THE FIGURES OF THE DRAWINGS

FIG. 1a is a view of a prior art planetary gear system which includes friction clutches and brakes for controlling the relative motion of the elements of the gearing.

FIG. 2 is a chart that shows a clutch and brake engagement and release pattern for the transmission of FIG. 1a.

FIGS. 9 and 9a, taken together, show a schematic view of the valve system for controlling the roller clutches or brakes in the transmission of FIG. 1.

FIG. 9b is a schematic representation of a shift solenoid that is used in the control system of FIGS. 9 and 9a.

PARTICULAR DESCRIPTION OF THE INVENTION

Figure 1:
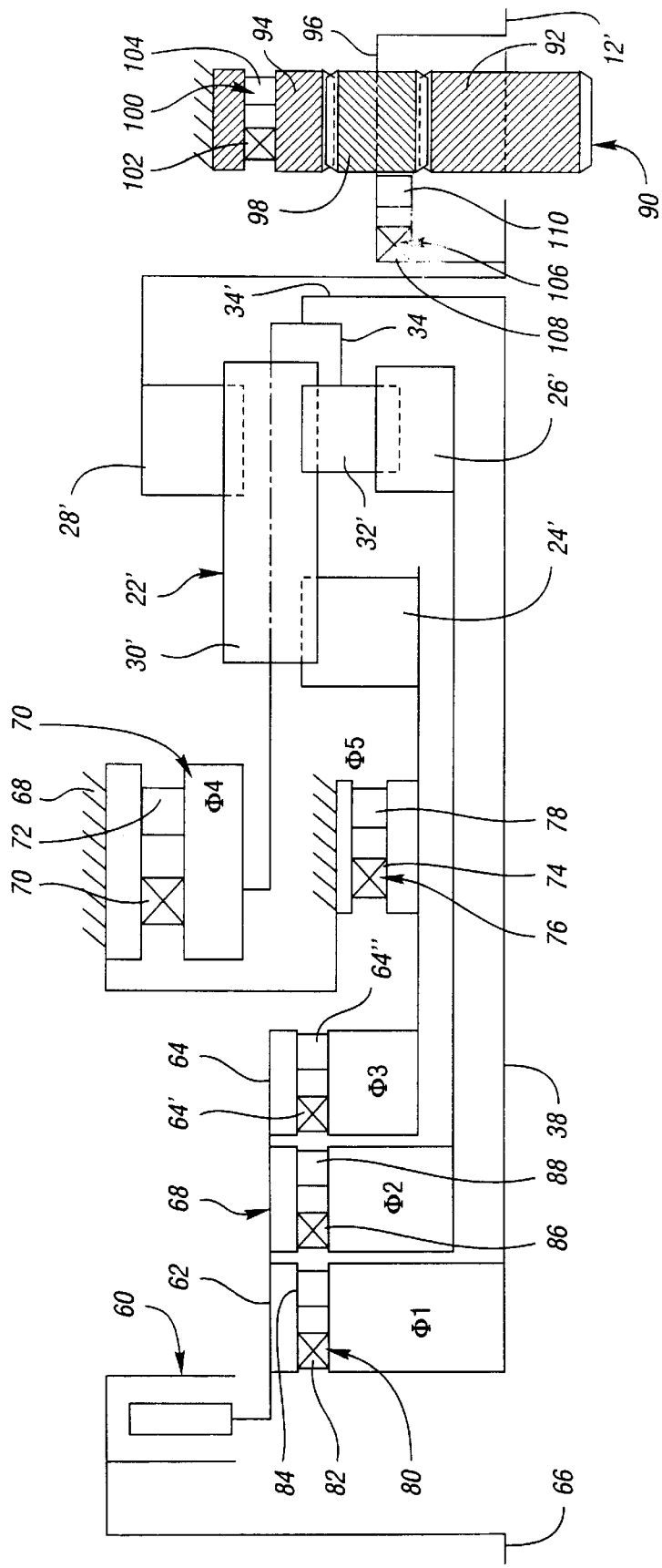
FIG. 1 is a schematic assembly view of a gear system capable of being used with the improved roller clutch and brake assembly.
Figures 1A, 2:
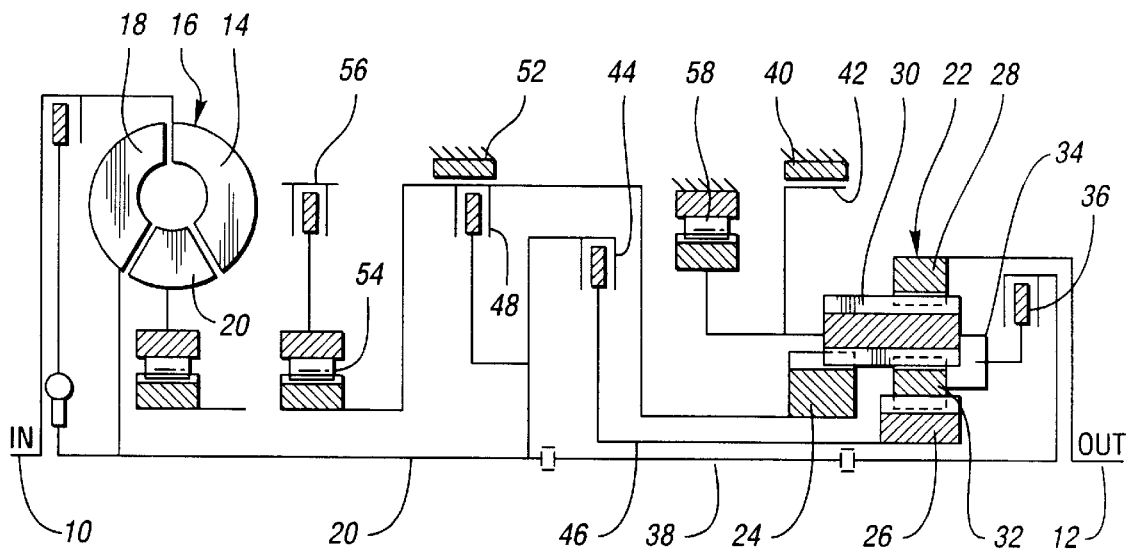

FIG. 1 shows a planetary gear transmission having gearing elements that correspond to the conventional transmission of FIG. 1a. The relative motion of the elements of the gearing of FIG. 1, however, are controlled by roller clutches and brakes rather than the friction clutches and brakes of the FIG. 1a transmission.

Referring first to FIG. 1a, a torque input shaft is shown at 10, and a torque output shaft is shown at 12. The torque input shaft 10 in the automotive vehicle driveline would be connected to an internal combustion vehicle engine. Shaft 10 is connected to the impeller 14 of a hydrokinetic torque converter generally indicated at 16.

The torque converter 16 includes a bladed turbine 18 and a bladed stator 20, the impeller 14, the turbine 18 and the stator 20 defining a toroidal fluid flow circuit. The torque developed hydrokinetically by the turbine is delivered to turbine shaft 20.

A compound planetary gear unit 22 includes a large diameter sun gear 24, a small diameter sun gear 26, a ring gear 28 and long and short planet pinions. The long planet pinions are shown at 30, and the short planet pinions are shown at 32. Pinions 30 engage the sun gear 34 and ring gear 28. Pinions 32 engage sun gear 26 and long planet pinions 30. The long and the short planet pinions are journalled on a common carrier 34, which is connected through clutch 36 (C3) to intermediate shaft 38. Ring gear 28 is connected drivably to the output shaft 12.

A low-and-reverse brake band 40 surrounds a brake drum 42, which is connected to the carrier 34. Turbine shaft 20 is connected to small sun gear 26 through a forward clutch 44 and sun gear sleeve shaft 46. Large sun gear 24 is connected to turbine shaft 20 through reverse clutch 48 and sun gear sleeve shaft 50. Shaft 50 can be braked by overdrive brake band 52 during overdrive operation.

During intermediate speed ratio operation, shaft 50 is braked by intermediate overrunning coupling 54, which has an outer race that is connected selectively to the transmission housing through an intermediate brake 56. The carrier 34 of compound planetary gear unit 22 can be braked by an overrunning coupling 58 during low speed ratio operation.

FIG. 2 is a chart that shows the engagement and release pattern for the clutches and brakes of the transmission of FIG. 1a. During ratio changes, the gear ratio and the corresponding clutches and brakes that are applied have been designated in vertical columns. The gear ratios are in the left column. The overdrive brake band is designated in FIG. 2 by the symbol B1. The low-and-reverse brake band 40 is designated in FIG. 2 by the symbol B2. The forward clutch 44 has been designated in FIG. 2 by the symbol C1. The reverse clutch 48 is designated C2, the direct and overdrive clutch 36 is designated C3. The low ratio overrunning coupling 58 is designated by the symbol C4. The intermediate clutch 56 is designated by the symbol C5. The overrunning coupling 54 is designated by the symbol C6. The X symbol in FIG. 2 designates a clutch or brake applied condition, and the symbol OR designates an overrunning condition.

The embodiment of the invention shown in FIG. 1 includes a gear set having compound gear elements that form a counterpart for the compound gear elements of the transmission of FIG. 1a. The gear elements that are common to the transmission of FIG. 1a have been designated by similar reference numerals, although prime notations are added.

In the case of the embodiment of the invention shown in FIG. 1, a so-called motion clutch 60 is applied during both forward drive and reverse drive. The large diameter sun gear 24' is connected to the torque output member 62 of the motion clutch 60 through a controllable roller clutch assembly 64, which will be described with reference to FIGS. 3–8. The roller coupling 64 has only two operating states; namely, an OFF state and an ON state. The ON state is represented by the locked symbol 64' and the OFF state or freewheeling state is shown by the freewheeling symbol 64".

Input torque from the engine is delivered directly through the motion clutch 60 to the torque output member 62. In the embodiment of the invention shown in FIG. 1, the torque converter of FIG. 1a has been eliminated. The engine is connected to the torque input side of the motion clutch 60 through input shaft 66.

Controllable roller coupling 68 selectively connects the torque output member 62 of the clutch 60 to the sun gear 26' during low speed ratio operation. At that time, the carrier 34' is braked against the transmission housing 68 by roller coupling 70 which is either locked or in a freewheeling state, as indicated by the symbols 70 and 72, respectively.

During fourth speed ratio or overdrive operation, sun gear 24' is braked by the controllable roller coupling 76. As in the case of the other controllable roller couplings, the coupling 76 has a locking state and a freewheeling state, as indicated by the symbols 74 and 78, respectively.

During third speed ratio operation, engine torque is delivered to shaft 38' through the controllable roller coupling 80, which has a locking state indicated by the symbol 82 and a freewheeling state indicated by the symbol 84. Couplings 68 and 80 assume their locked or applied states during third speed ratio operation, which is a direct-drive ratio. Coupling 68 has a clutch lock state indicated by the symbol 86 and an overrunning state indicated by the symbol 88.

As previously indicated, the embodiment of the invention shown in FIG. 1 does not include a torque converter. Typically, a transmission of the type shown in FIG. 1a requires a torque converter to multiply engine torque during acceleration of the vehicle from a standing start. This additional torque multiplication is achieved in the embodiment of the present invention by providing a simple planetary gear unit 90 at the torque output side of the transmission gearing 22'. The gear unit 90 comprises sun gear 92, ring gear 94, carrier 96 and planet pinions 98 journalled on the carrier 96. Pinions 98 drivably engage ring gear 94 and sun gear 92. Carrier 96 is connected to torque output shaft 12'.

The gear unit 90 provides an additional gear ratio as ring gear 94 is braked by controllable roller coupling 100, which is in a locked state designated by the symbol 102 and an overrunning state indicated by the symbol 104. When torque is delivered from the ring gear 28' to the sun gear 92, an additional reduction ratio can be achieved by anchoring the ring gear 94 with the controllable roller coupling 100. Another controllable roller coupling 106 selectively connects sun gear 92 with the carrier 96 when a one-to-one driving ratio in the gear unit 90 is desired. The locked state of the coupling 96 is indicated by the symbol 108, and the release state or overrunning state is indicated by the symbol 110. During operation of the transmission in each of the four driving ratios described previously, the controllable roller coupling 106 would be applied and the controllable roller coupling 100 would be released.

FIGS. 5–8 shown in generally schematic form the controllable roller couplings that are used in the embodiment of the invention illustrated in FIG. 1. Although the description of the coupling of FIGS. 5–8 will refer to specific elements that are identified by reference numerals not used in FIG. 1, it should be understood that the coupling described in FIGS.

5–8 can be used at the various locations of the gear system of FIG. 1. Each coupling shown in FIG. 1 has an outer race, an inner race and roller coupling elements situated between the races.

Figure 5:
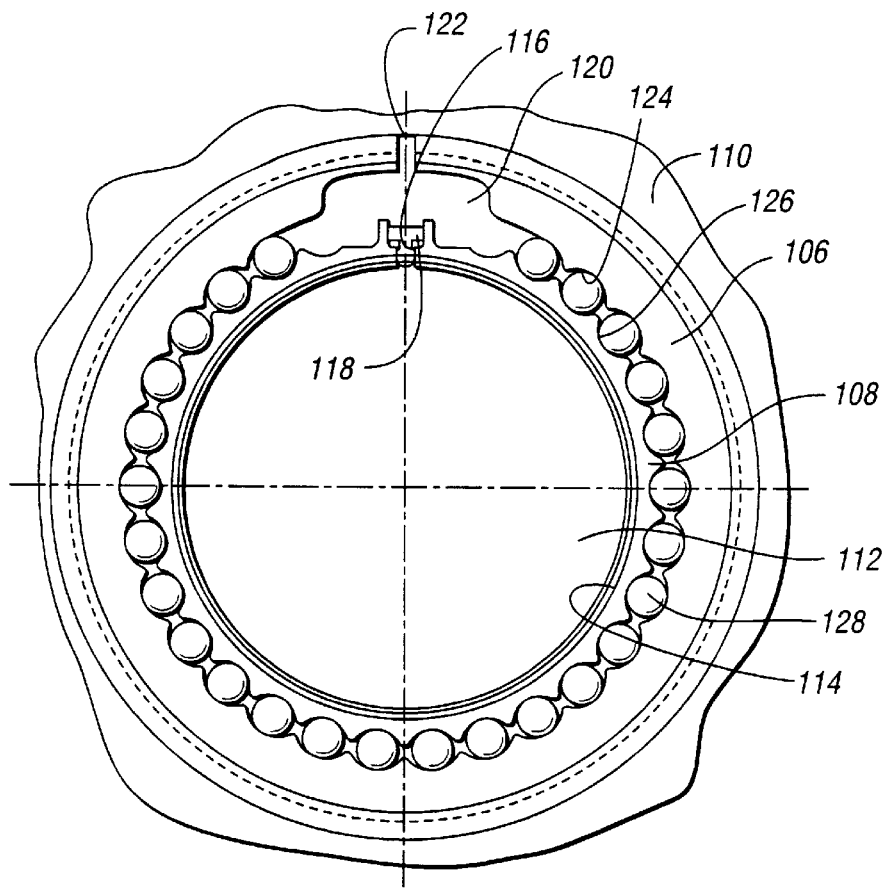
FIG. 5 shows an alternate clutch or brake mechanism that may be used in the transmission of FIG. 1 as a replacement for the roller clutch or brake of FIG. 3.

As shown in FIG. 5, the coupling that is generic to each of the coupling arrangements shown in FIG. 1 includes an outer race 106, an inner race 108, and a coupling housing 110 which is splined or keyed or otherwise secured to the outer periphery of the race 106.

A torque delivery shaft 112 extends through the central opening 114 in the inner race 108. The diameter of the opening 114 is slightly larger than the diameter of the shaft 112.

The inner race 108 is split to provide a gap 116 between the split ends. A fluid seal 118 is located in the gap. The outer race 106 defines a pressure chamber 120, which communicates with a pressure source through pressure supply passage 122 formed in the clutch structure 110.

A plurality of recesses 124 is formed in the inner surface of the outer race 106. A plurality of recesses 126 is formed on the outer surface of the inner race 108. The recesses in the inner race and the outer race are juxtaposed, one with respect to the other, to define a roller cavity. Each roller cavity receives a roller 128. The peripheral edges of the recesses 126 and 124 define ramps that are engaged by the rollers. As race 108 is shifted relative to race 106, the rollers 128 will ramp up the ramp surfaces of the recesses in which they are located, thereby exerting a radial force on the race 108. This tends to decrease the diameter of the race 108, thereby establishing a frictional torque on the outer surface of the shaft 112. A radial force applied to the surface of the shaft 112 creates a self-energizing radial force which tends to lock the shafts 112 against movement relative to the outer race 106.

Figure 6:
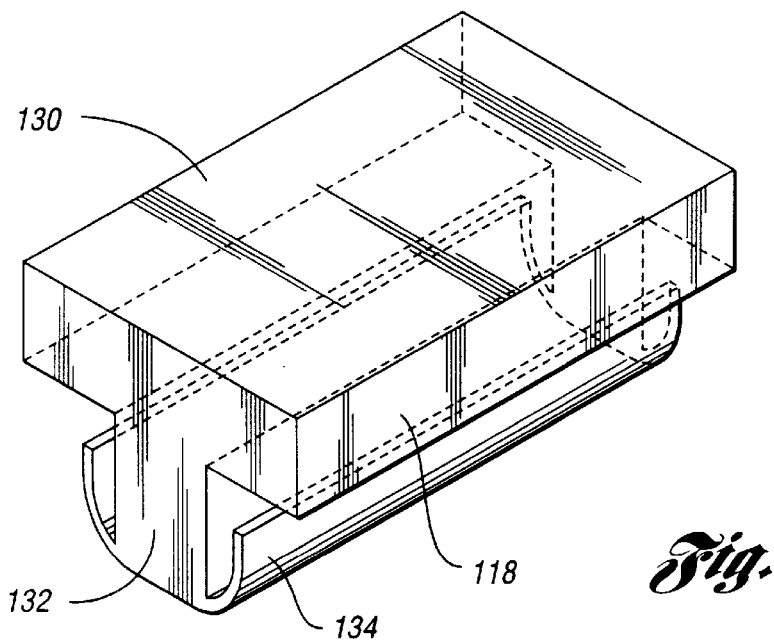
FIG. 6 is an isometric detailed view of an elastomeric seal that is used in the embodiment of the roller clutch of FIG. 5.

The seal 118 is shown in isometric detail in FIG. 6. When pressure is applied to the pressure chamber 120, pressurized fluid passes through the annular space between the inner and outer races occupied by the rollers, thereby exerting a radial pressure force on the inner race. This decreases the diameter of the inner race. Normally, a gap exists between the outer surface of the shaft 112 and the inner race. When pressure is applied to the outer race, the gap closes, providing zero clearance between the inner race and the shaft and creating a frictional torque. The fluid seal 118 is sufficiently flexible to permit the gap 116 to close when the coupling is applied.

The seal 118 has an elastomeric rectangular section 130 and a central portion 132 extending radially inward of the rectangular section 130. Sealing lips 134 on the portion 132 effectively seal the pressure chamber 120.

Figure 3:
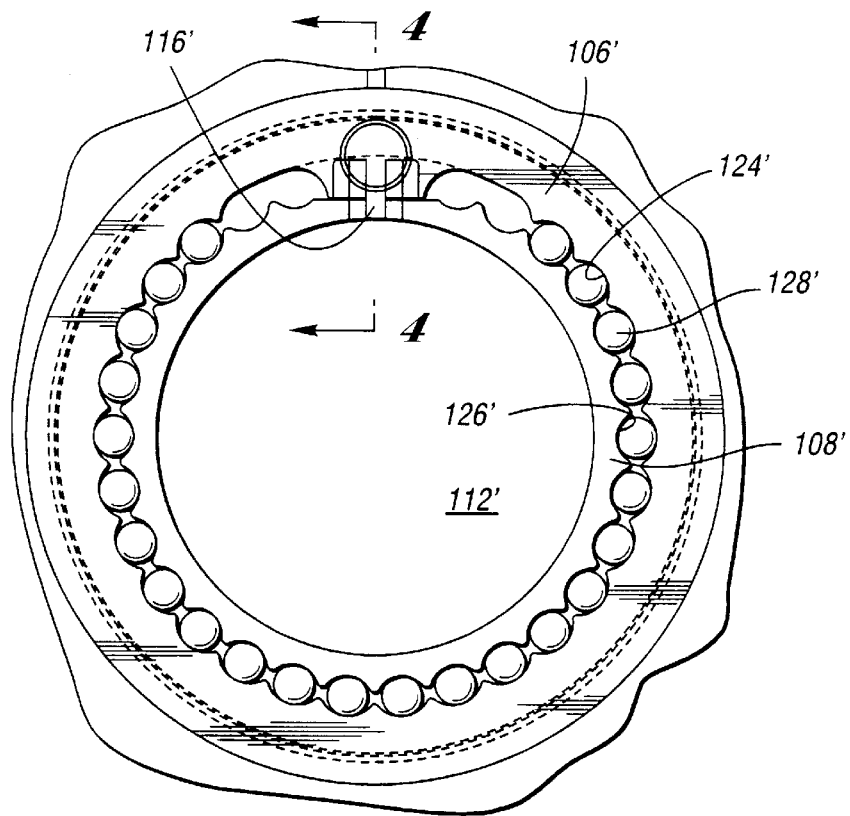
FIG. 3 is an assembly view of a roller clutch or brake that may be used in the transmission of FIG. 1.

FIG. 3 shows an alternate embodiment of the roller coupling of FIG. 5. In the case of the embodiment of FIG. 3, the torque transfer shaft 112', when it rotates relative to the race 108', creates a drag torque that tends to shift the inner race 108' relative to the outer race 106'. This will cause the rollers 128' to ride up the ramps defined by the recesses 124' and 126' formed in the outer race 106' and the inner race 108', respectively. This creates a wedging action that establishes a radial force on the inner race which frictionally locks the inner race to the shaft 112'.

In FIG. 3, the elements that have a counterpart in FIG. 5 have been designated by the same reference characters used in FIG. 5, although prime notations are added.

Figure 4:
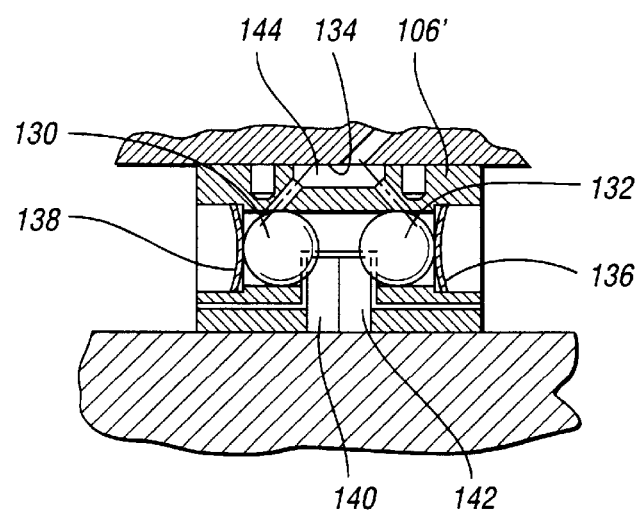
FIG. 4 is a cross-sectional view taken along the plane of section line 4—4 of FIG. 3.

As in the case of the embodiment of FIG. 5, the inner race 108' in FIG. 3 is split to provide a gap 116'. The outer race 106' has a transverse opening as indicated in FIG. 4. A pair of actuator balls 130 and 132 is located in the transverse opening, the opening being designated in FIG. 4 by reference numeral 134. The axial ends of the opening 134 are sealed by sealing elements 136, 138. The balls 130 and 132 are adapted to engage, respectively, tapered ramp surfaces 140 and 142 formed on one of the split ends of the inner race. The other split end of the inner race also has ramps corresponding to ramps 140 and 142. These also are engaged by the balls 130 and 132 to create a balanced force. Pressure is applied to the axial outward sides of the balls 130 and 132 by fluid pressure ports 144 formed in the outer race 106'.

When fluid pressure is applied to the balls 130 and 132, the split ends of the inner race will separate, thereby increasing the size of the gap 116'. This will cause a clearance between the outer surface of the shaft 112' and the inner surface of the inner race. This permits freewheeling motion of the shaft relative to the inner race.

Figure 8:
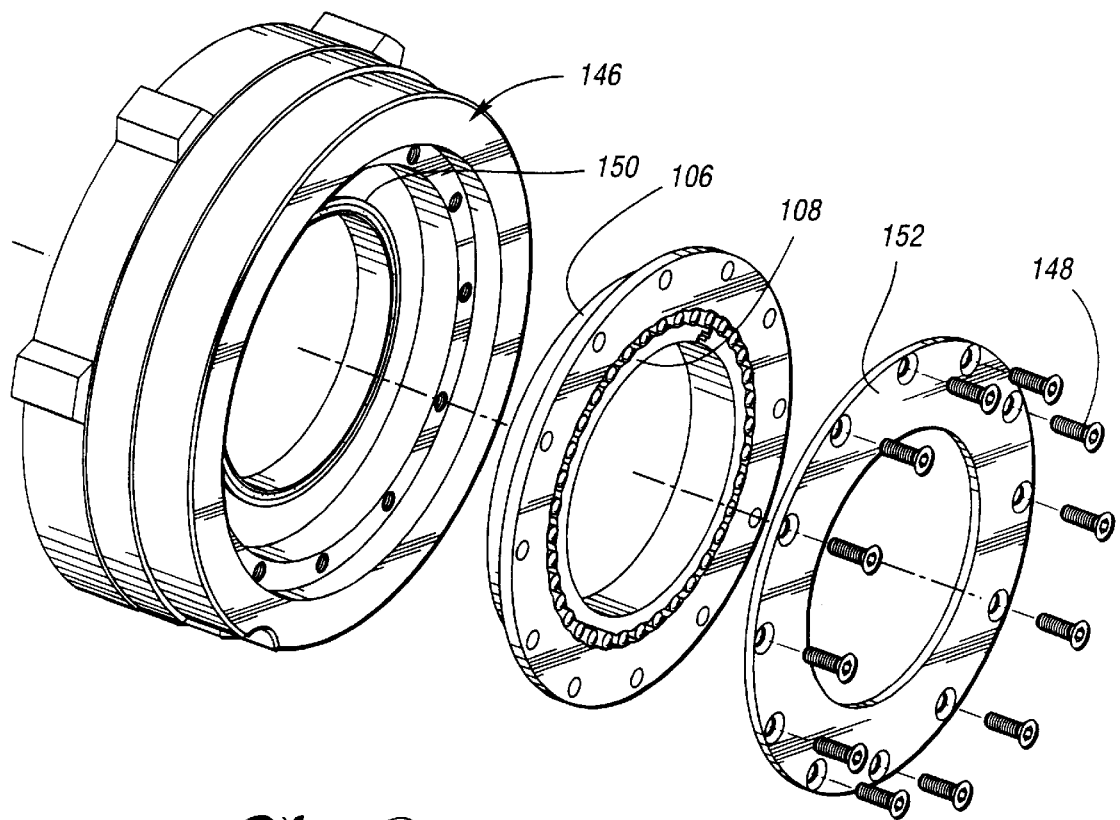
FIG. 8 is an exploded view of a clutch or brake mechanism for use in the transmission of FIG. 1.

FIG. 8 shows an exploded isometric view of a roller coupling of the type shown schematically in FIG. 5 and in FIG. 3. It includes a coupling housing 146 which encloses the outer race 106'. Race 106' is secured within the housing by fasteners such as threaded bolts 148. An O-ring seal 150 located in an O-ring seal groove in the housing 146 engages the axial planar surface of the inner race 108'. An end plate 152 is secured by the bolts 148 to the outer race 106'. The plate 152 serves to define the pressure chamber for the embodiment of FIG. 5.

Figure 7:
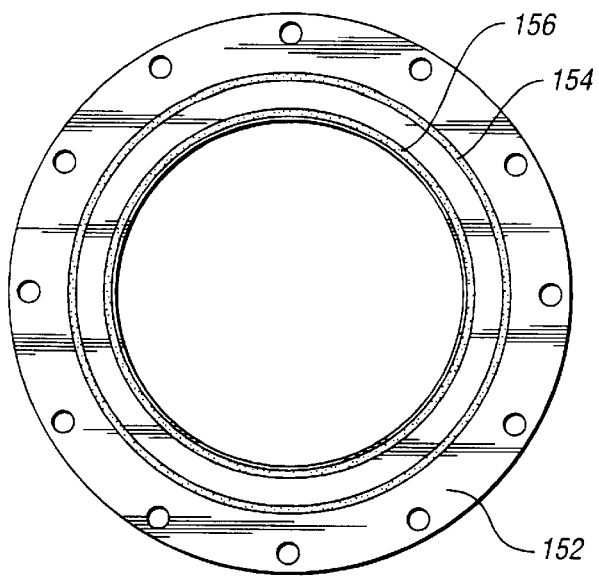
FIG. 7 is a plan view of an end plate that forms a part of the clutch or brake structure illustrated in FIGS. 3 or 5.

As seen in FIG. 7, the inside planar surface of the plate 152 has seal ring grooves within which O-rings 154 and 156 are located. Ring 154 seals against the outer race, and seal 156 seals against the inner race when the coupling elements of FIG. 8 are assembled.

The roller coupling structures shown in FIGS. 5–8 have been described in more particular detail in the copending patent application identified previously. Reference may be made to that copending application for the purpose of supplementing this disclosure. The disclosure of the copending application is incorporated in this disclosure by reference.

Figure 9A:
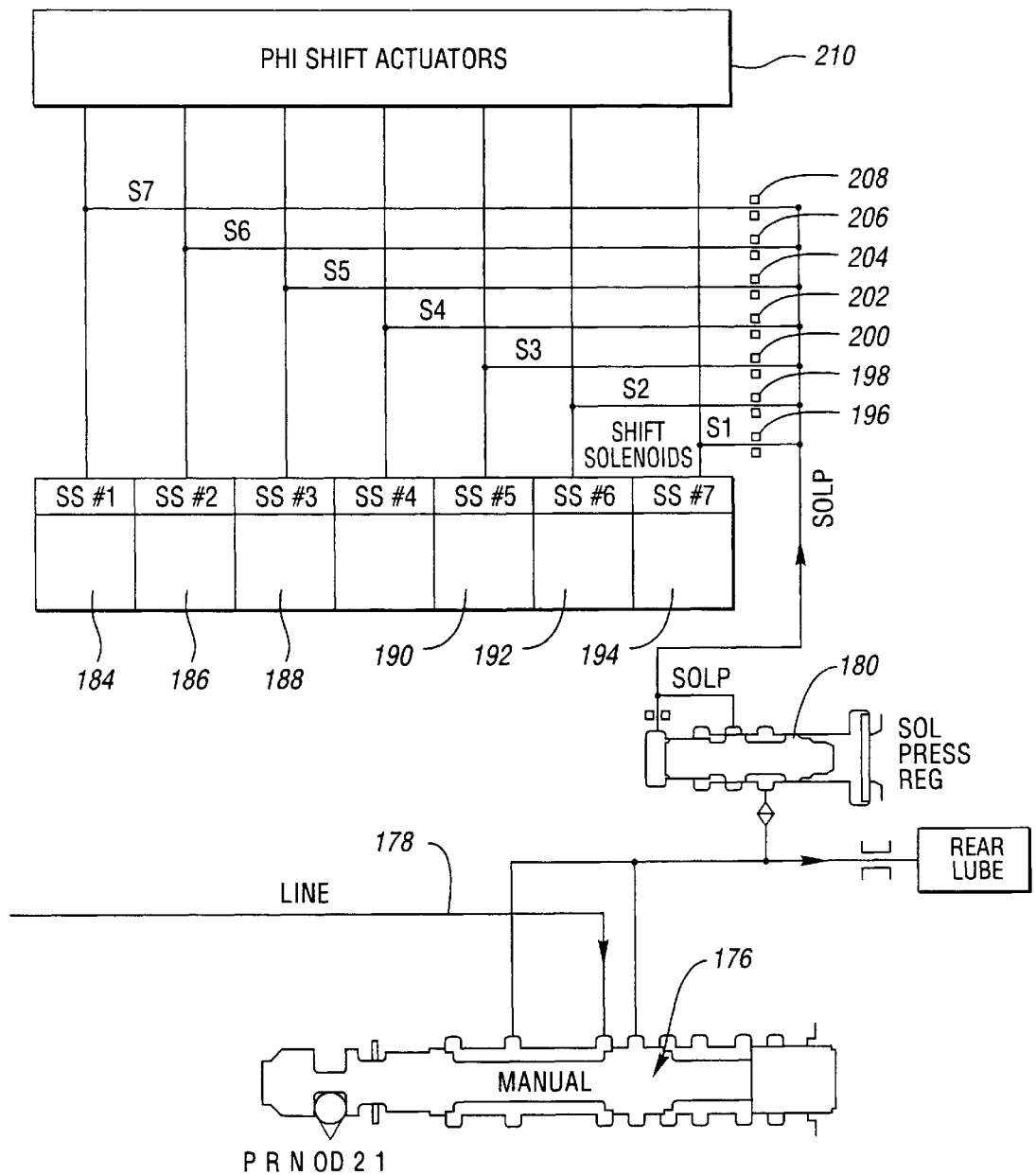

FIGS. 9 and 9a show a schematic valve diagram that may be used to selectively pressurize and release the roller couplings for either the coupling embodiment of FIG. 5 or the coupling embodiment of FIG. 3. The valve circuit of FIGS. 9 and 9a comprise a main regulator 158, which comprises a valve spool 160 urged in an upward direction by valve spring 162. A pump, which is typically an engine-driven pump, supplies the main regulator valve 158 with line pressure, the line pressure pump being shown at 164.

The discharge side of the pump 164 pressurizes the upper end of the valve spool 160, as shown at 166. This opposes the force of the spring 162. The output passage for the pump, shown at 168, has a regulated pressure which depends upon the spring rate of the spring 162. The force of the spring 162 can be supplemented by an electronic pressure control signal pressure in passage 170. The presence of electronic control pressure in passage 170 will increase the regulated pressure in passage 168. An electronic pressure control valve 172 regulates the pressure in passage 170. Electronic pressure control valve 172 is actuated by solenoid 174.

Line pressure is supplied from the main regulator valve to manual valve 176, which can be adjusted by the operator to any one of the positions indicated in FIG. 9. A so-called overdrive ratio position is indicated in FIG. 9. Park and neutral positions serve to lock the output shaft to prevent vehicle motion and to exhaust pressure to the solenoids, and thereby to the actuators. All range selection functions are performed by electrical energization of the solenoid valves.

Line pressure, which is distributed to the manual valve 176 through line pressure passage 178, is transferred through the manual valve to a solenoid pressure regulator valve 180. This valve is a simple regulator valve that modulates the pressure in passage 178 to produce a solenoid-regulated pressure in passage 182.

Seven shift solenoids are shown in FIG. 9 and designated by the symbols 184–194. Each shift solenoid valve is supplied with line pressure from passage 182 through a separate flow control orifice shown at 196–208.

The fluid pressure actuators for the roller clutches have been generally designated in FIG. 9 by the symbol 210. These are called shift actuators in FIG. 9 because they effect either an ON condition or an OFF condition for the coupling. The coupling is locked when the actuator is on, and freewheeling motion is effected when the actuator is off.

FIG. 9b shows in schematic form a shift solenoid that would be located at the shift solenoid locations 184–194. The solenoid schematically shown in FIG. 9b includes a solenoid housing 212 which encloses electric solenoid windings 214 surrounding the solenoid core 216. A spring 218 applies a spring force to ball valve element 220, which is seated in a valve seat formed in pressure passage 222. A ball valve actuator arm 224, which is pivoted on the housing 212 at 226, engages the ball valve element 220. A spring 218 exerts a force on the arm 224. When the solenoid is energized, the armature 216 shifts in an upward direction until it engages a stop 228, thereby decreasing the spring force acting on the ball valve element 220. The regulated solenoid pressure in passage 182, which is distributed across a flow control orifice to the control pressure passage 184, thus creates a reduced pressure in passage 184 and a reduced pressure in the pressure chambers for the actuators 210. Thus, the actuators 210 are applied or released depending upon whether a shift solenoid signal is present in the various shift solenoids 184–194.

Although preferred embodiments of the invention have been disclosed, it will be apparent to persons skilled in the art that modifications of the invention may be made without departing from the scope of the invention. All such modifications and equivalents thereof are defined by the following claims.

What is claimed is:

1. A multiple-ratio transmission mechanism for transferring power from a vehicle engine to a torque output shaft comprising torque delivery gear elements in a transmission housing defining plural torque delivery paths;
   a motion clutch connecting selectively the engine to each of multiple torque delivery elements of the transmission mechanism;
   at least one first multiple roller coupling selectively connecting the torque delivery elements to a torque output side of the motion clutch;
   at least one second roller coupling connecting selectively the torque delivery elements to the housing, thereby providing a torque reaction brake for the transmission mechanism for each torque-multiplying torque delivery path;
   each coupling comprises concentric inner and outer coupling races, the inner and outer races for each coupling having rollers disposed between them the outer race having an inner surface with external, peripherally spaced recesses formed therein and the inner race having an outer surface with external, peripherally spaced recesses formed therein, the inner race surrounding one of the torque delivery elements; the internal and external recesses defining ramps that are engageable by the rollers; the inner race being split to define split ends with a gap therebetween;
   a fluid pressure chamber partly defined by each inner race; and
   fluid pressure actuators communicating with each pressure chamber to selectively pressurize the pressure chamber to establish and disestablish frictional engagement of the inner race and the torque delivery element, thereby selectively locking and releasing the torque delivery element as the inner and outer races shift angularly, one with respect to the other, causing the rollers to engage the ramps.

2. The transmission mechanism as set forth in claim 1 wherein the pressure chamber surrounds the inner race;
   a flexible seal in the gap between the split ends of the inner race;
   the effective diameter of the inner race decreasing as pressure in the pressure chamber increases to effect frictional engagement of the torque delivery element by the inner race.

3. The transmission mechanism set forth in claim 1 wherein at least one of the first roller couplings comprises actuator ramps on the split ends of the inner race;
   an axially extending actuator pressure chamber in the outer race;
   at least one actuator ball in said actuator pressure chamber engageable with the actuator ramps; and
   pressure passage communicating with the pressure chamber to establish a pressure force on the actuator ball thereby interrupting frictional engagement of the inner race and the torque delivery element.

4. The transmission mechanism as set forth in claim 3 wherein two actuator balls are in the actuator pressure chamber, each actuator ball engaging a separate one of the actuator ramps whereby the axial components of the pressure forces acting on the split ends of the inner race are balanced.

5. The transmission mechanism set forth in claim 1 wherein the gear elements comprise first and second sun gears, a ring gear, a set of long planet pinions engaging the first sun gear and the ring gear and a set of short planet pinions engaging the second sun gear and the long planet pinions; and
   a common carrier journaling the long planet pinions and the short planet pinions;
   the ring gear being drivably connected to the torque output shaft.

6. The transmission set forth in claim 5 wherein the driving connection between the ring gear and the torque output shaft comprises a final drive gearset having a torque input element connected to the ring gear and a torque output element connected to the torque output shaft;
   a second of said second roller couplings selectively anchoring a reaction element of the final drive gearset against the housing;
   an additional one of the first roller couplings selectively connecting together two torque delivery elements of the final drive gearset.

7. The transmission mechanism set forth in claim 5 wherein one of the first roller couplings, when it is actuated, connects the motion clutch to the first sun gear and a second of the first roller couplings connects the motion clutch to the second sun gear.

8. The transmission mechanism set forth in claim 7 wherein one of the second roller couplings, when it is actuated, connects the common carrier to the housing thereby providing a torque reaction point as the torque delivery elements establish a torque delivery path.

* * * * *